United States Patent [19]

Starkovich et al.

[11] 4,069,304

[45] Jan. 17, 1978

[54] HYDROGEN PRODUCTION BY CATALYTIC COAL GASIFICATION

[75] Inventors: John A. Starkovich, Redondo Beach; Jack L. Blumenthal, Los Angeles, both of Calif.

[73] Assignee: TRW, Redondo Beach, Calif.

[21] Appl. No.: 645,858

[22] Filed: Dec. 31, 1975

[51] Int. Cl.$^2$ .................... C01B 1/02; C01J 3/00

[52] U.S. Cl. .................. 423/648 R; 48/202; 48/206; 252/441; 252/476; 423/657

[58] Field of Search ............... 423/648, 657, 651, 652; 48/202, 206; 252/373, 441, 476

[56] References Cited

U.S. PATENT DOCUMENTS

| 2,781,248 | 2/1957 | Gorin | 423/652 |
| 2,807,529 | 9/1957 | Tarbox | 48/202 X |
| 2,840,462 | 6/1958 | Gorin | 48/202 X |
| 3,108,857 | 10/1963 | Gorin et al. | 423/652 |

OTHER PUBLICATIONS

Taylor et al., "American Chemical Society", vol. 43, 1921, pp. 2055–2071.

*Primary Examiner*—Edward J. Meros
*Attorney, Agent, or Firm*—John J. Connors; Benjamin DeWitt; Donald R. Nyhagen

[57] ABSTRACT

Coal is catalytically reacted with steam to produce hydrogen. Various Group I metal salts such as $K_2CO_3$, $Na_2CO_3$ and borax are used as catalysts. These catalysts are stabilized with fluoride containing salts such as $CaF_2$ to thereby extend their life. Alternatively, NaF was found to be a thermally stable catalyst for the reaction.

12 Claims, 5 Drawing Figures

HYDROGEN PRODUCTION BY CATALYTIC COAL GASIFICATION

BACKGROUND OF THE INVENTION

This invention relates to a process for gasifying coal using steam, lime, and stabilized Group I metal salt catalysts. More specifically, the invention also concerns stabilized Group I metal salt catalysts using fluoride salts of Group II metals such as $CaF_2$ for catalyst stabilization.

Early work involving the production of hydrogen from coal has been disclosed in British Patent 8743 (1910). This patent showed a reaction with coal char and steam to produce hydrogen and $CO_2$. The reaction mixture contained lime as a carbon oxide acceptor and an alkali salt catalyst such as $K_2CO_3$, borax, $Na_2CO_3$, etc. For convenience, this process is termed the catalytic-steam-carbon-lime process (CSCL).

Other techniques for producing hydrogen are known and include the steam-oxygen processes which basically produce a synthesis gas composed mainly of carbon monoxide and hydrogen. This is achieved by a high temperature endothermic reaction of steam with carbon ($H_2O + C \rightarrow CO + H_2$) and the exothermic reaction of oxygen with carbon ($C + \frac{1}{2} O_2 \rightarrow CO$). The synthesis gas produced must be catalytically shifted to hydrogen and $CO_2$ through the lower temperature water gas shift reaction ($CO + H_2O \rightarrow CO_2 + H_2$). Carbon dioxide and sulfur gases are then removed from the gas stream by liquid phase absorption to yield relatively pure hydrogen gas. Lurgi, Koppers-Totzek and Winkler type gasifiers could all be used for these processes to produce hydrogen.

One major disadvantage of the steam-oxygen processes is that the steam-oxygen gasifiers operate at very high temperature (3500° F in the case of Koppers-Totzek) in comparison to the CSCL process which employs a reaction temperature of about 1200° F - 1400° F.

Furthermore, oxygen is required in the gasifiers to provide the energy required for the endothermic steam-carbon reaction. In the case of Koppers-Totzek, approximately 0.8 tons of oxygen is required for every ton of coal gasified. By comparison, no oxygen is required in the CSCL process.

Finally, separate water-gas, shift reactor and $CO_2$ and sulfur gas removal is required for the steam-oxygen processes. By comparison, sulfur and $CO_2$ removal takes place "in-situ" in the CSCL process.

Another technique for producing hydrogen is by the steam-iron process which produces hydrogen through the reaction of steam with iron ($3Fe + 4H_2O \rightarrow Fe_3O_4 + 4H_2$). The iron is then regenerated by reduction of the iron oxide product with a clean synthesis gas ($CO + H_2$). The primary disadvantage of this scheme in comparison with the CSCL process is that $\frac{1}{2} - \frac{3}{4}$ of a mole of clean (sulfur free) impure hydrogen ($CO + H_2$) is required to regenerate the iron oxide for every mole of pure hydrogen which is produced. On the other hand low grade, high ash residual char can be used to regenerate the lime in the $CO_2$ acceptor scheme.

A basic problem, however, exists with the CSCL process. This problem involves the deactivation of the Group I metal salt catalyst which tends to be poisoned by reaction at high temperature with silica, alumina or alumino-silicates (in the coal ash) in the gasifier or in the lime regenerator. British Patent 8743 (1910) referred to, supra, did not teach how to stabilize the catalyst to prevent deactivation or how to regenerate the lime.

It is, therefore, an object of this invention to provide a CSCL process and apparatus for producing hydrogen in which the lime is regenerated and the catalyst remains active and, hence, reusable.

Another object is to provide a CSCL process and apparatus for producing hydrogen rapidly at 1200° F - 1400° F via the reaction:

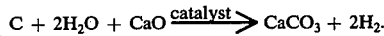

$$C + 2H_2O + CaO \xrightarrow{catalyst} CaCO_3 + 2H_2.$$

Another object is to provide a CSCL process and apparatus having high reaction selectivity to hydrogen, with carbon dioxide being the only other significant reaction product. A sufficiently low reaction temperature would permit most of the carbon monoxide initially formed to be shifted through a reaction with steam ($CO + H_2O \rightarrow CO_2 + H_2$) to carbon dioxide and sorbed by the lime.

Another object is to provide a CSCL process and apparatus wherein the hydrogen production reaction is slightly exothermic and, hence, no requirement is necessary for heat addition (or oxygen addition) in the gasifier.

Another object is to provide a CSCL process and apparatus having a lime regeneration reaction

$$(CaCO_3 \xrightarrow{heat} CaO + CO_2)$$

which can be completely decoupled from the hydrogen production reaction. This enables use of a variety of low cost energy sources (e.g., combustion of the residual high ash content char with air rather than oxygen) to effect the limestone decomposition.

Another object is to provide a CSCL process having a reactive system in which sulfur compounds which are present in coal are retained in the lime/limestone mixtures thereby eliminating the necessity for a separate sulfur removal system.

Another object is to provide a CSCL process and apparatus having a reaction system which is capable of recycling stabilized catalysts many times between a primary reactor and a lime regenerator without losing their activity.

Another object is to provide new and improved catalysts which may be employed in the CSCL process wherein the catalysts are able to: 1) gasify less reactive chars in addition to the highly reactive lignites that are used primarily in the present systems; and 2) operate at lower temperatures thereby resulting in greater retention of both carbon oxides and sulfur compounds in the lime without coking or fusion problems.

THE INVENTION

According to the invention, new and novel catalysts and stabilizers therefor are provided for the CSCL process to produce hydrogen. The catalyst comprises either:

a. a Group I metal salt and a fluoride salt of a Group II metal, or b. Group I metal fluoride salt such as sodium fluoride.

Use of the Group II metal fluoride salt appears to stabilize the catalytic activity of the Group I metal salt and permits its reuse several times in the process, including lime regeneration

(i.e., $CaCO_3 \xrightarrow{heat} CaO + CO_2$).

By contrast, if the stabilizer is not employed, the activity of the alkali salt catalyst is only effective for one reaction; this is probably dependent on the silica or alumina content. In general, catalyst activity decreases less rapidly with increasing $CaF_2$ content, while the activity loss rate depends on the $SiO_2$ content.

Typical Group I metal salt catalysts which may be employed in the process include: $K_2CO_3$, $K_2B_4O_7$, $Na_2B_4O_7$, $Na_2CO_3$ and mixtures of Group I metal salts; a NaCl-KCl mixture has been found to have significantly higher activity than the individual components. Also, these catalysts in their natural mineral forms such as sylvinite, soda ash, kernite, trona and borax, have good activity.

Stabilizers include $CaF_2$, in pure form and in the mineral form such as fluorite. It is possible that the fluorosilicates of Ca, Na and K together with their mineral analogues may also be suitable.

Typical stabilized catalyst systems include: $K_2CO_3$—$CaF_2$, $Na_2B_4O_7$—$CaF_2$, $Na_2CO_3\cdot NaHCO_3$—$CaF_2$, NaCl—$CaF_2$, etc. and NaF (which is stable by itself).

Table 1 shows the results of employing a stabilizer such as $CaF_2$ with an alkali catalyst such as $K_2CO_3$. It will be evident that Samples D and E performed significantly better than the other catalyst combinations. Sample F containing substantial quantities of silica resulted in a reduction of catalyst activity and appears to confirm the poisoning effect on the catalyst. Sample H demonstrates the stability, by itself, of a NaF catalyst.

The addition of more $CaF_2$ is postulated to cause the in situ formation of a catalytically active fluorosilicate complex.

TABLE 1

| Sample | | Cycle* | Regeneration Temperature °C | Gasification Rate % Carbon Gasified Hour at 650° C | Remarks |
|---|---|---|---|---|---|
| Lime-char + 5% $K_2CO_3$ | | 1 | — | 100 | New char added after each cycle on the basis that all residual carbon was burned out during regeneration. No additional catalyst or lime was added. |
| | | 2 | 850 | 52 | |
| A | | 3 | 850 | 3 | |
| | | 4 | 850 | 0 | |
| Lime-Char + 5% $Na_2B_4O_7$ | | 1 | — | 53 | New char added after each cycle on the basis that all residual carbon was burned out during regeneration. No additional catalyst or lime was added. |
| | | 2 | 850 | 11 | |
| B | | 3 | 850 | 0 | |
| Lime-Char + 5% KF | | 1 | — | 85 | New char added after each cycle on the basis that all residual carbon was burned out during regeneration. No additional catalyst or lime was added. |
| | | 2 | 850 | 28 | |
| C | | 3 | 850 | 6 | |
| Lime-Char + 5% $K_2CO_3$ + | | 1 | — | 89 | New char added after each cycle on the basis that all residual carbon was burned out during regeneration. No additional catalyst or lime was added. |
| | | 2 | 850 | 88 | |
| 10% $CaF_2$ | | 3 | 850 | 92 | |
| | | 4 | 850 | 97 | |
| D | | 5 | 900 | 82 | |
| | | 6 | 900 | 83 | |
| | | 7 | 900 | 25 | |
| | | 8 | 900 | 6 | |
| Lime-Char + 5% $K_2CO_3$ + | | 1 | — | 88 | |
| | | 2 | 850 | 90 | New char added after each cycle. |
| 3% $CaF_2$ | | 3 | 850 | 66 | |
| | | 4 | 850 | 7 | 3% fresh $CaF_2$ added after Cycle 4. |
| E | | 5 | 850 | 56 | |
| | | 6 | 850 | 46 | |
| | | 7 | 850 | 46 | |
| | | 8 | 850 | 40 | |
| | | 9 | 850 | 42 | |
| | | 10 | 850 | 35 | |
| | | 11 | 850 | 33 | |
| Lime-Char + 5% $K_2CO_3$ + | | 1 | — | 80 | |
| | | 2 | 850 | 65 | New char added after each cycle. |
| 5% $CaF_2$ + | | 3 | 850 | 95 | |
| F | | 4 | 850 | 110 | |
| 3% $SiO_2$ | | 5 | 850 | 22 | 3% fresh $CaF_2$ added after Cycle 5. |
| | | 6 | 850 | 90 | |
| Lime-Charcoal + 5% $Na_2B_4O_7$ + | | 1 | — | 14 | |
| | | 2 | 850 | 5 | New char added after each cycle. |
| G 5% $SiO_2$ | | 3 | 850 | 2 | |
| 3% $CaF_2$ Added After Cycle 3 | | 4 | 850 | 27 | 3% fresh $CaF_2$ added after Cycle 3. |
| | | 5 | 850 | 34 | |
| Lime-Charcoal + 5% NaF | | 1 | — | 52 | |
| | | 2 | 850 | 47 | New char added after each cycle. |
| H | | 3 | 850 | 48 | |
| | | 4 | 850 | 49 | |
| | | 5 | 850 | 53 | |

*Cycle 1 in all cases refers to the initial reaction rate prior to exposure to the lime regeneration conditions.

Weight ratios of catalyst-stabilizer combinations may vary from about 0.2 to 5 and typical ratios are:
$K_2CO_3$—$CaF_2$ 1:1, $K_2CO_3$—$CaF_2$ 2:1; $K_2CO_3$—$CaF_2$ 1:2;
Borax—$CaF_2$ 1:1; Borax—$CaF_2$ 1:2; Borax—$CaF_2$ 2:1; NaCl—$CaF_2$ 2:1; Trona—$CaF_2$ 1:1; Trona—$CaF_2$ 1:3.

Types of CaO acceptors include: decomposed, chemically pure, calcite; run-of-mine limestone; dolomite; etc. A useful weight range of lime acceptor varies from about 10% to 90% by weight.

The type of carbonaceous materials which may be employed in this invention include: char, coal, cellulosic wastes, agricultural wastes, etc.

The catalyst may be dry blended with the char, lime coal, etc., prior to reaction; alternately, the char or lime, may be impregnated with the catalyst prior to gasification. Concentrations of catalyst in the char or lime may vary from about 0.5% to 25%. The catalyst may also be employed as compressed pellets, sintered pellets, sintered compressed pellets, etc.

IN THE DRAWINGS

DESCRIPTION OF THE PREFERRED EMBODIMENTS

Figure 1:
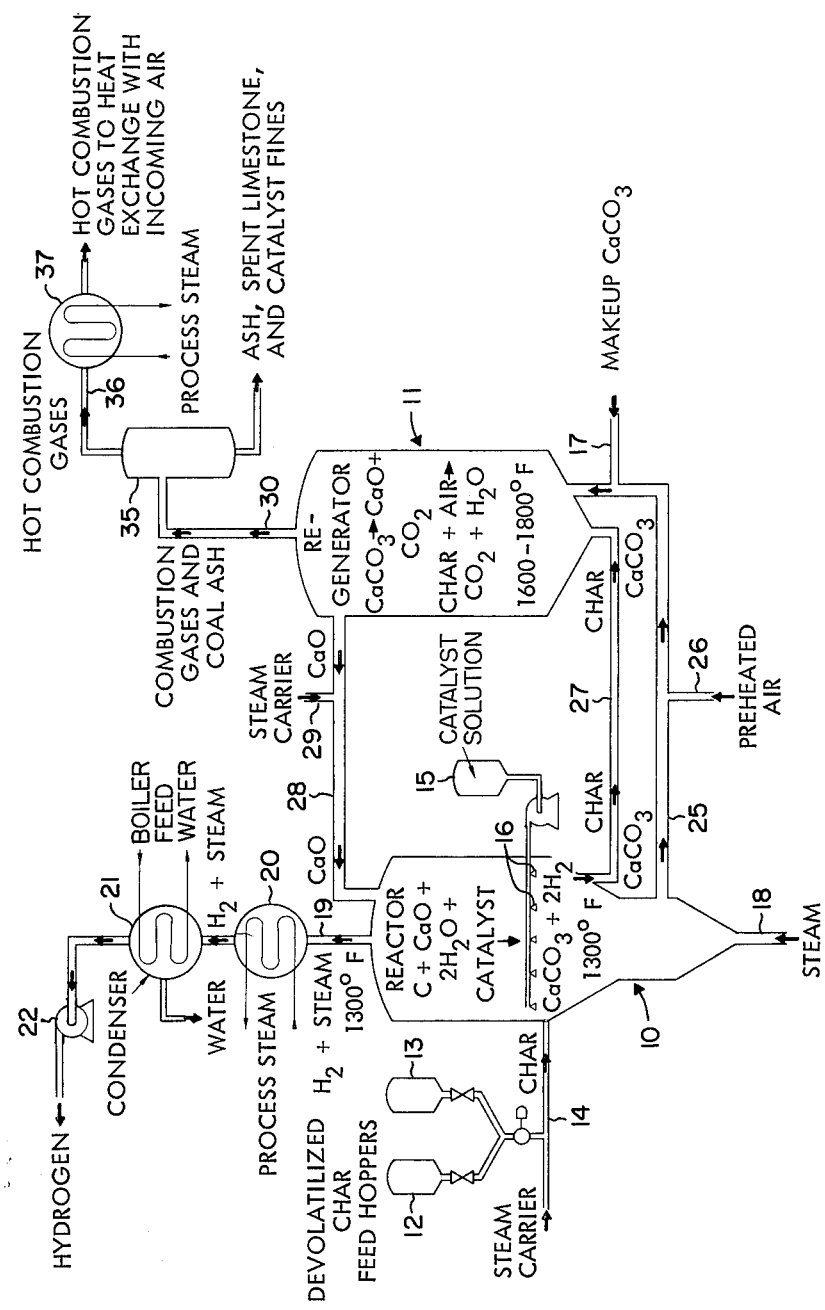
FIG. 1 shows a schematic view of an apparatus which may be employed for carrying out the process of this invention.

One form of apparatus which may be employed to carry out the process of this invention is shown schematically in FIG 1.

This provides a reactor 10 for converting $H_2O$, char and lime into $CaCO_3$ and $H_2$ as follows:

$$C + CaO + 2H_2O \xrightarrow[\text{catalyst}]{1300° F} CaCO_3 + 2H_2.$$

A regenerator 11 converts the calcium carbonate to lime and reacts char and air to form $CO_2$ and produce process steam in a waste heat boiler as follows:

$$\text{Heat} + CaCO_3 \xrightarrow{1600° F-1800° F} CaO + CO_2 \text{ (endothermic)}$$

$$\text{Char and Air} \xrightarrow{1600° F-1800° F} CO_2 \text{ (exothermic)}$$

Char for the process may be stored in feed hoppers 12, 13 and fed through a lime 14 into the reactor using a steam carrier as shown.

The catalyst may be dry or wet blended with the char or lime prior to feeding into the reactor. Alternately, as shown, the catalyst may be fed from a feed tank 15 into the reactor 10 and applied to the char or lime from a plurality of sprayers 16. The stabilizer such as $CaF_2$ may be fed into the reactor as a slurry along with the catalyst solution. Alternately, the stabilizer may be fed into the reactor along with the char. As a third possibility, the stabilizer may be fed into the system along with make-up $CaCO_3$ through line 17.

Reactor temperatures may vary from about 550° C – 800° C and pressures may vary from at least above 1 atmosphere and preferably about 1 – 20 atmospheres. Process steam is fed into the reactor bottom through line 18 to provide water for the reaction and also to produce a fluidized bed.

Steam and hydrogen are removed together as overhead through line 19. Some of the process steam is recovered in the waste heat boiler unit 20 and hot boiler feed water is produced in condenser 21.

The bottoms from the reaction principally include $CaCO_3$, char, catalyst, and stabilizer. $CaCO_3$, being the heaviest and largest particle size, is taken from the lowest part of the reactor through line 25 and fed to the regenerator 11 along with preheated air fed through line 26.

After entering into the catalyzed reaction to produce hydrogen, the residual char is forwarded into the regenerator 11 through line 27. In the regenerator, $CaCO_3$ is converted to lime and residual char to $CO_2$ at temperatures of about 800° C – 1100° C; a preferred temperature range varies from about 870° C – 980° C. Regenerator pressures of about 1 – 20 atmospheres are suitable. The reactor and regenerator are operated at approximately the same pressures. Catalyst, stabilizer and lime are removed as overheads and recycled through line 28 to the reactor 10 using a steam carrier injected through line 29.

Hot combustion gases, and solids such as coal ash, $CO_2$, catalyst fines and spent limestone containing sulfur from the burned coal are removed periodically through line 30 and passed to a separator 35. Hot combustion gases are removed from the separator 35 and passed through line 36 to a heat exchanger 37 for production of process steam and then to heat incoming air for use in the regenerator 11. The solids which have been separated in separator 35 may be passed to a sludge pond.

Figure 2:
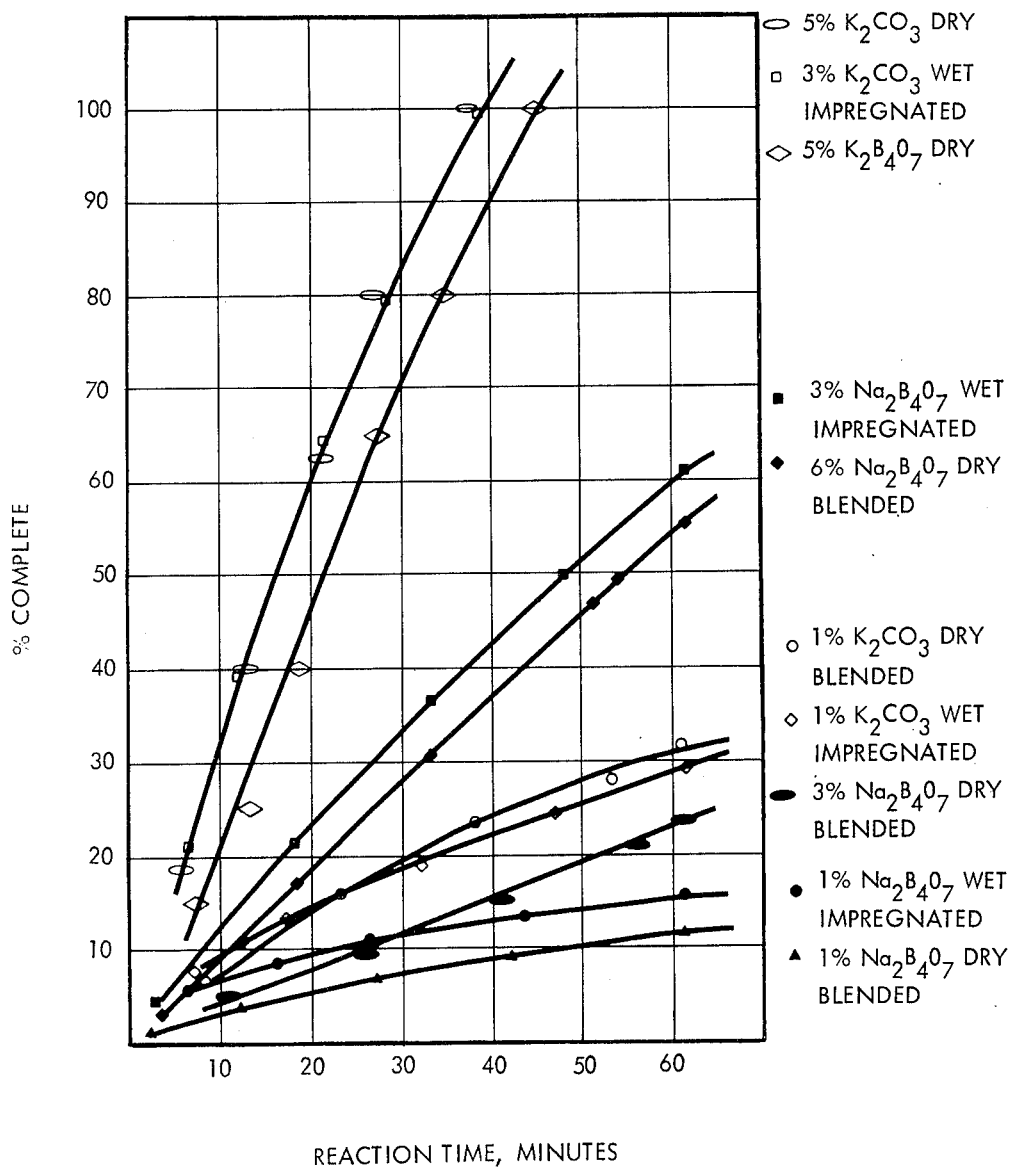
FIG. 2 is a graph showing the relation between reaction time and conversion rate for various mixtures of catalyst both dry blended and wet impregnated.

FIG. 2 shows the differences between employing the catalyst dry blended with the char compared to wet impregnation of the char. In all cases, except 1% $K_2CO_3$, use of wet impregnation of the char by the catalyst achieves faster gasification rates.

Figure 3:
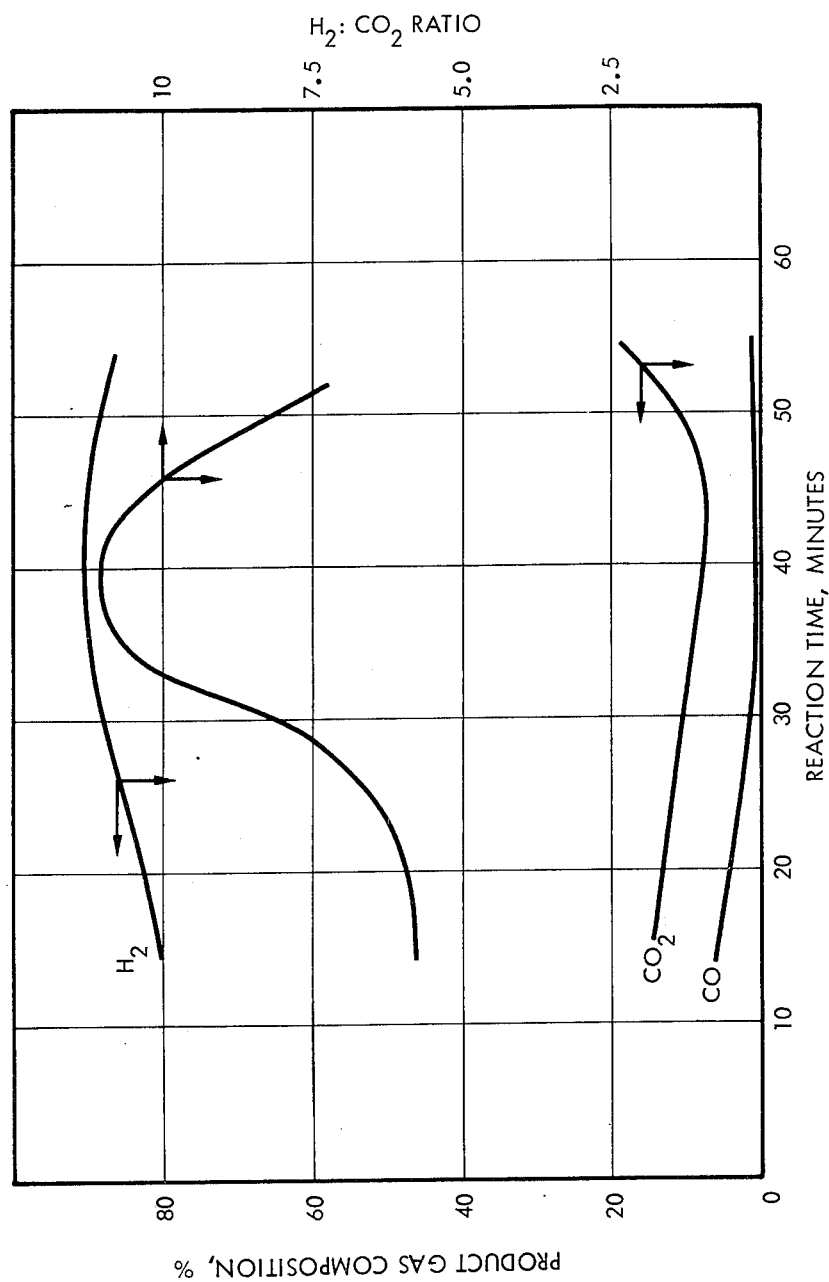
FIG. 3 is a graph showing typical product gas compositions and $H_2:CO_2$ ratios as a function of time in a batch reactor run.

FIG. 3 shows the high purity gas produced by the process of this invention since the lime functions as an acceptor to combine with the $CO_2$ which is produced.

Figure 4:
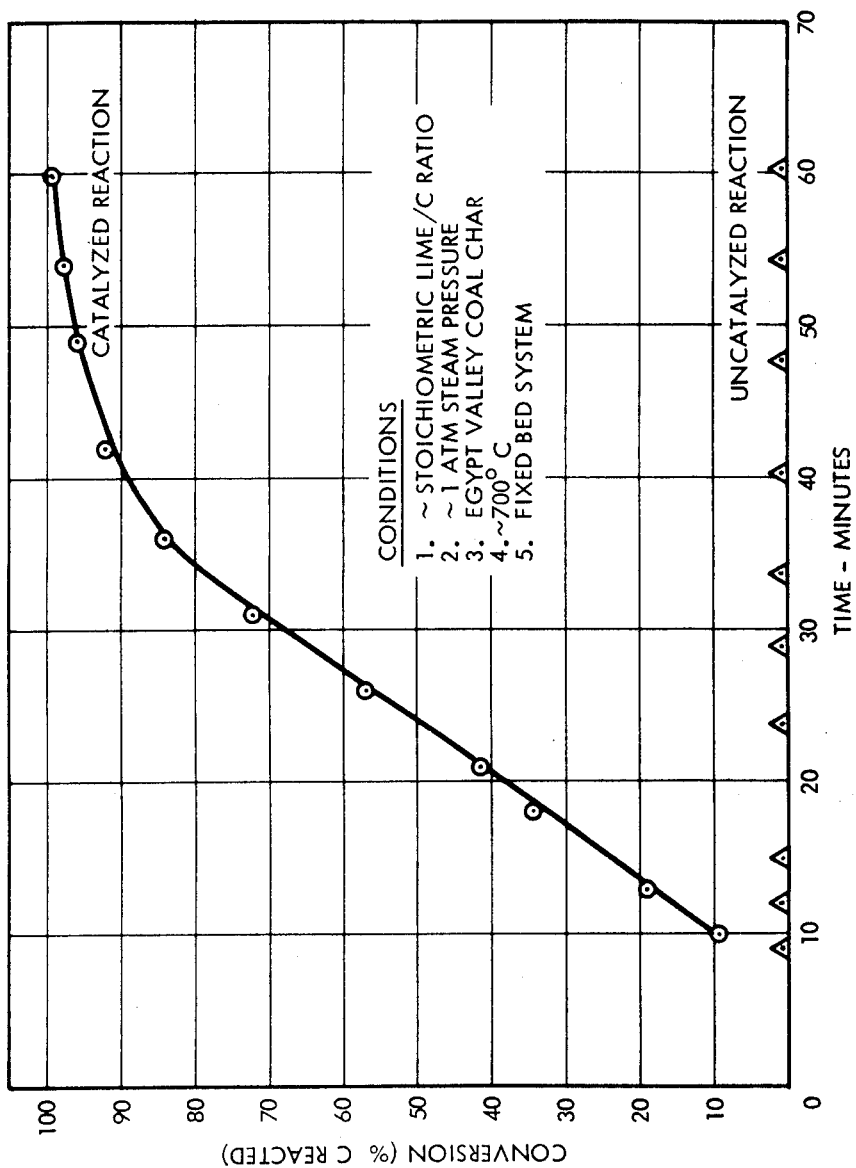
FIG. 4 is a graph showing the relation between $CO_2$ conversion and reaction time for a catalyzed and uncatalyzed reaction.

FIG. 4 shows the carbon conversion rate from Egypt Valley coal char at 650° C using $K_2CO_3$ compared to an uncatalyzed reaction. It is evident that no significant $H_2$ conversion is attainable at these temperatures without the catalyst.

Figure 5:
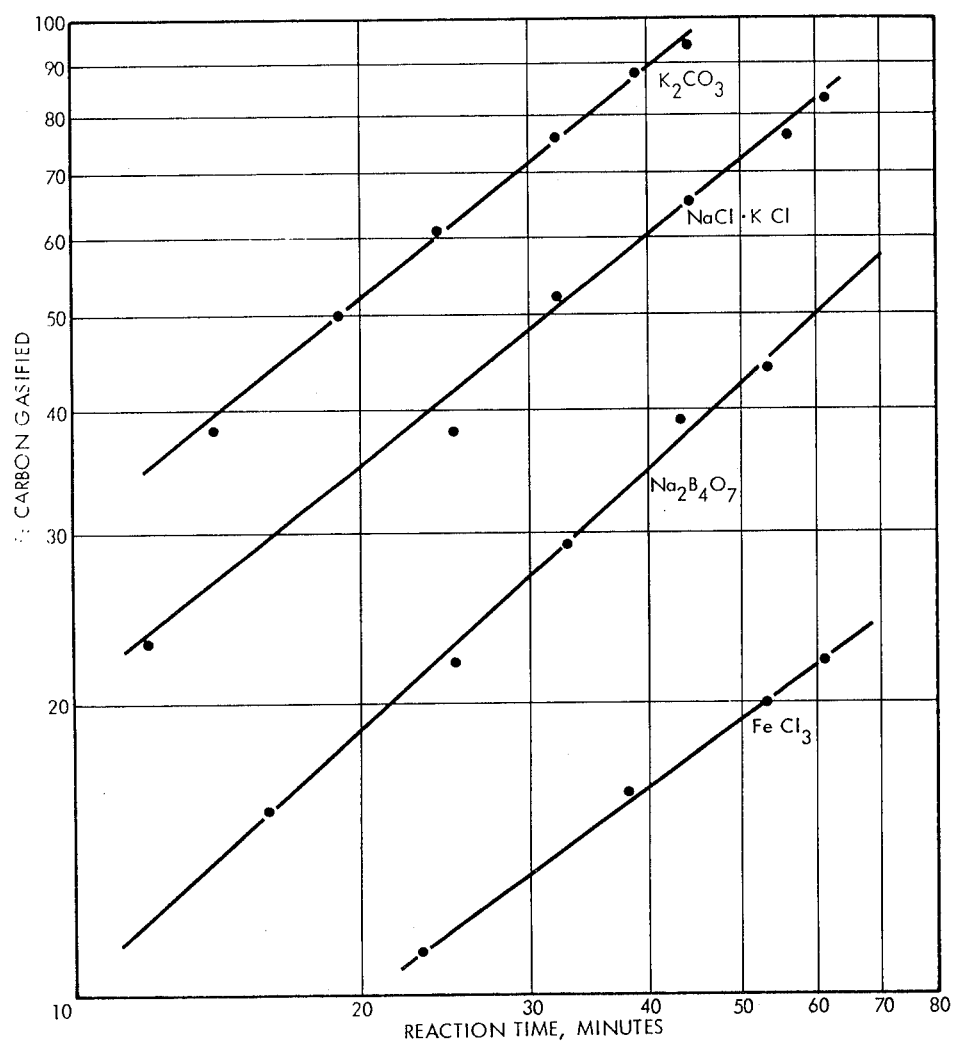
FIG. 5 is a graph showing the relation between carbon gasification and reaction time for various catalyst types.

FIG. 5 shows a comparison between use of an alkali salt catalyst and a non-alkali salt such as $FeCl_3$ to achieve gasification. It is obvious that the $FeCl_3$ conversion rate is not sufficiently high to render its use attractive for a catalyst.

The effect of temperature on gasification rates varies depending on the catalyst type. This is shown in the following Table 2.

TABLE 2

| Effect of Temperature on Gasification Rate | | |
|---|---|---|
| Catalyst | Temperature ° C | Reaction Rate % Conversion Min$^{-1}$ |
| 5 wt. % $K_2CO_3$ | 550 | 0.061 |
| | 600 | 0.18 |
| | 650 | 2.7 |
| | 700 | 5.4 |
| | 750 | 10.8 |
| 5 wt. % $Na_2B_4O_7$ | 550 | 0.070 |
| | 600 | 0.16 |
| | 650 | 0.89 |
| | 700 | 2.1 |
| | 750 | 7.7 |
| No Catalyst | 650 | 0.01 |
| | 750 | 0.27 |

The data indicates that $K_2CO_3$ is more reactive than $Na_2B_4O_7$ and that the minimum effective gasification temperature for both catalysts is about 650° C. Reaction temperatures will vary for other catalysts, but the minimum is probably about 550° C.

The catalysts of this invention provide an economic method for hydrogen production in the CSCL process. This in turn permits a new and improved plant and process suitable for continuous operation rather than necessitating a removal of the entire catalyst load and consequent frequent interruption in the process.

We have also found that the stabilized catalysts described herein are very active for classical coal gasification reactions such as steam-carbon as shown in the following Table 3. It can be seen from Table 3 that the $CaF_2$ stabilized $K_2CO_3$ is several times more active than pure $K_2CO_3$ for steam-carbon reactions. Furthermore, the catalyst does not sinter at the operating temperatures.

TABLE 3

| Mixture | Temp. °C | Gas Generation Rate For Equivalent Carbon cc/min | Condition of Residue |
|---|---|---|---|
| C + STEAM + $K_2CO_3$ | 825° C | 10.2 | Sintered (Probable Melting) |
| C + STEAM + $K_2CO_3$ + $CaF_2$ | 825° C | 38.0 | Unsintered |

We claim:

1. A process for producing hydrogen comprising the steps of:
   a. reacting steam, carbonaceous material and lime with a catalyst to produce hydrogen, residual carbon and $CaCO_3$, the catalyst being selected from the group consisting of (1) NaF and (2) a salt of a Group I metal stabilized with a fluoride of a Group II metal;
   b. regenerating $CaCO_3$ to lime, converting the residual char to combustion products;
   c. reusing the catalyst and regenerated lime for further reaction with steam and carbonaceous material to produce additional hydrogen, and
   d. drawing off product, including hydrogen.

2. The process of claim 1 in which the catalyst comprises primarily a salt of a Group I metal stabilized with calcium fluoride.

3. A process for producing hydrogen by the CSCL process comprising the steps of:
   a. reacting steam, carbonaceous material and lime with a catalyst in a first reaction zone, said catalyst being selected from the group consisting of (1) NaF and (2) a salt of a Group I metal stabilized with a fluoride salt of a Group II metal;
   b. removing catalyst, $CaCO_3$, steam and residual char to a second reaction zone;
   c. regenerating $CaCO_3$ to lime and converting residual char to combustion products in said second reaction zone;
   d. recycling the catalyst and regenerated lime to the first reaction zone and
   e. taking a product stream, including $H_2$, from the first reaction zone.

4. The process of claim 3 in which the fluoride salt is $CaF_2$.

5. The process of claim 3 in which the salt of a Group I metal is selected from the class consisting of: (a) $K_2CO_3$, $K_2B_4O_7$, $Na_2B_4O_7$, NaCl, KCl, $Na_2CO_3$, $NaHCO_3$, NaCl—KCl, and mixtures thereof, sylvinite, soda ash, kernite, trona, and borax.

6. The process of claim 3 in which the lime is present in the form of a material selected from the class consisting of: (a) decomposed, chemically pure, calcite; (b) run-of-mine-limestone and (c) dolomite.

7. The process of claim 3 in which the reaction temperature in the first reaction zone is within the range from about 550° C – 800° C and the pressure in the first reaction zone is within the range from about one atmosphere to about 20 atmospheres.

8. The process of claim 3 in which the operating pressures in the first and second reaction zones are substantially equal.

9. The process of claim 3 in which the first reaction zone comprises a fluidized reaction bed.

10. The process of claim 3 in which the catalyst and lime are recycled with a steam carrier.

11. The process of claim 3 in which the temperature, in the second reaction zone, is within the range from about 800° C – 1100° C and the pressure is in the range from about 1 to 20 atmospheres.

12. The process of claim 3 in which the temperature, in the second reaction zone, is in the range from about 870° C – 980° C.

* * * * *